United States Patent
Lorenz et al.

[15] 3,694,493
[45] Sept. 26, 1972

[54] PROCESS FOR THE PRODUCTION OF METHALLYL SULPHONIC ACID AND SALTS THEREOF

[72] Inventors: Gunter Lorenz; Heinrich Rinkler; Gunther Nischk, all of Dormagen, Germany

[73] Assignee: Fabenfabriken Bayer Aktiengesellschaft, Leverkusen, Germany

[22] Filed: Oct. 17, 1969

[21] Appl. No.: 867,381

[30] Foreign Application Priority Data

Oct. 24, 1968 Germany..........P 18 04 833.4

[52] U.S. Cl. ............................................260/513 R
[51] Int. Cl............................................C07c 143/16
[58] Field of Search ..................................260/513 R

[56] References Cited

UNITED STATES PATENTS 2,365,783  12/1944  Suter..........................260/686
3,121,737  2/1964   Rutkowski et al. ....260/513 R
2,218,660  10/1940  Schowalter et al.....260/513 R

OTHER PUBLICATIONS

Terentev et al., Chem. Abstracts 47 12238i (1953)
Gilbert, Sulfonation and Related Reactions, pages 120 and 121. (1965)
Gilbert, Sulfonation and Related Reactions pages 42–44 (1965)
Gilbert, Sulfonation & Related Reactions pp 47– 53 (1965) Interscience Pubs., New York. N.Y.
Kitilla Dimethyl Formamide Chemcial Uses, E. I Du Pont de Nemours, Publishers (1967) pages 213 & 214

Primary Examiner—Leon Zitver
Assistant Examiner—L. B. Crescente
Attorney—Plumley and Tyner

[57] ABSTRACT

Process for the production of methallyl sulfonic acid and salts thereof by reaction of isobutylene and a complex of sulfur trioxide and an N,N-dialkyl substituted amide of an aliphatic carboxylic acid or a N-alkyl substituted lactam wherein at least 1 mol of isobutylene is used for 1 mol of sulfur trioxide. The methallyl sulfonic acid and their salts are comonomers in the polymerization of olefinic compounds.

1 Claim, No Drawings

PROCESS FOR THE PRODUCTION OF METHALLYL SULPHONIC ACID AND SALTS THEREOF

This invention relates to an improved process for the production of methallyl sulphonic acid, and salts thereof, by sulphurizing isobutylene, followed by neutralization.

Unsaturated sulphonic acids are important monomers for copolymerization with other olefinically unsaturated compounds, acrylonitrile in particular. The resulting copolymers show a high affinity for basic dyes. Salts of methallyl sulphonic acid have proved to be particularly suitable for this purpose.

Hitherto, methallyl sulphonates have been produced on a commercial scale by various processes involving the reaction of methallyl chloride with sodium sulphite in aqueous solution. Although this process ultimately gives high yields of sodium methallyl sulphonate, it is not altogether satisfactory in some respects. For example, 1 mol of sodium chloride is formed for each mol of sulphonate obtained. These two products have to be separated from one another because excessive chloride components can adversely affect a subsequent polymerization reaction. Separation is usually carried out by dissolving out or partially crystallizing the sulphonate with solvents, and is relatively expensive.

Finally, it is not readily possible to obtain salts other than the sodium salt. To prepare salts of organic bases, the free acid has to be prepared from the sodium salt with an acid ion exchanger, after which the aqueous solution obtained has to be neutralized with the required base and reconcentrated by evaporation.

It is known from *J.Amer.Chem.Soc.*63, (1941), pages 978 and 1,594, that methallyl sulphonic acid is formed when isobutylene is treated in ethylene chloride with a dioxan/sulphur trioxide complex. Unfortunately, secondary products are also formed. Altogether, three substances were isolated one of which was identified as 2-hydroxy-2-methyl propane-1-sulphonic acid. Due to the limited stability of the dioxan/$SO_3$-complex, this process has never worked on a commercial scale.

According to *Bull. Soc. Chim. France* (1965) 787, methallyl sulphonic acid can also be formed by the action of sulphur trioxide on isobutylene in liquid sulphur dioxide at $-20°$ C. After the excess $SO_2$ has been evaporated and the residue decomposed with ice, violet-colored solutions are obtained which contain methallyl sulphonic acid and, following neutralization, yield its salts. Since the free acid is extremely unstable, the discoloration observed is presumably caused by decomposition products. Due to the very low reaction temperature, this process is extremely difficult to operate on a commercial scale, in addition to which there is a danger of the reaction product containing rather large quantities of sulphite unless the sulphur dioxide is completely removed before neutralization.

Furthermore, a disulphonic acid corresponding to the formula

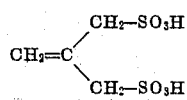

is readily formed when an excess of sulphur trioxide is used. Consequently, an $SO_3/SO_2$ mixture must always be added to isobutylene in order to synthesize methallyl sulphonic acid.

According to *Chemisches Zentralblatt* (1955) 9064, the action of sulphur trioxide/pyridine on isobutylene also yields a mixture of mono and disulphonic acids, which has to be separated by fractional crystallization of the salts.

It is an object of this invention to provide a process for the production of methallyl sulphonic acid and its salts which avoids the difficulties mentioned above. This object is accomplished by a process for the production of methallyl sulphonic acid and salts thereof, which comprises reacting isobutylene with a complex of sulphur trioxide and an amide compound selected from the group consisting of an N,N-dialkyl substituted amide of an aliphatic carboxylic acid and a N-alkyl substituted lactam, said reacting being effected in a reaction medium consisting of an excess of said amide compound at a temperature of from $-20°$ to $+60°$ C, and employing at least 1 mol of isobutylene to 1 mol of sulphur trioxide, neutralizing the solution of the methallyl sulphonic acid thus obtained with a basic compound selected from the group consisting of an organic base and an inorganic base and concentrating the neutralized solution thus obtained by evaporation at reduced pressure.

Surprisingly, no secondary reactions take place. Colorless solutions are obtained from which, following concentration, the salts of methallyl sulphonic acid are isolated in highly pure form.

One advantage of the process according to the invention is that it is possible to avoid using pyridine or liquefied sulphur dioxide, and that the $SO_3$ complexes used, already known from the literature, are highly stable and can actually be stored for prolonged periods at room temperature without decomposing. The following amides and lactams are suitable as complex forming agents and at the same time as reaction media of this kind: N,N-di-methyl formamide; N,N-diethyl formamide; N,N-dimethyl acetamide; N,N-diethyl acetamide; N-methyl-2-pyrrolidone; N-ethyl-2-pyrrolidone; and N-methylcaprolactam.

It is preferred to use N,N-dimethyl formamide, N,N-dimethyl acetamide or N-methyl-2-pyrrolidone. The water content should be as low as possible, i.e. preferably less than 0.1 percent by weight.

The $SO_3$-complexes are prepared by known methods; for example by running liquid $SO_3$ dropwise into the complex-forming solvent with cooling and stirring, or by distilling $SO_3$ gas from fuming sulphuric acid and absorbing it in the complex-former. The $SO_3$ content can be calculated from the increase in weight. The solutions from which some of the complexes can be precipitated, are immediately ready for use. In addition, these complexes may be prepared very easily by introducing fuming sulphuric acid having a content of sulphur trioxide as high as possible (oleum) dropwise into the complex-former with cooling. It has been found that the $H_2SO_4$ component of the oleum does not enter into any reaction with the isobutylene under the reaction conditions selected and following neutralization, and can readily be separated off by filtration in the form of a substantially insoluble sulphate, for example in the form of $Na_2SO_4$.

Surprisingly, it has been found that at low temperatures of up to about 20° C there is no reaction involving excess SO$_3$-complex to form a disulphonic acid, so that it is possible to introduce the isobutylene into the SO$_3$-complex while cooling until the stoichiometric quantity or a slight excess is present. The isobutylene is preferably introduced at a temperature in the range from −10° to +20° C. It is of course possible, too, initially to introduce the isobutylene and then gradually to add the SO$_3$-complex dropwise in solution in excess complex-former. Because of the ease of handling, however, the first method is preferred.

Once the equimolar quantity or slight excess of isobutylene, based on sulphur trioxide, has been introduced into the reaction mixture, the cooling system is removed and the mixture is allowed to rise slowly to room temperature or is gently heated. At temperatures above 0° C., a little excess isobutylene is initially distilled off in some instances, followed by a slightly exothermic reaction during which the temperature rises to the range from +25° to +35° C., depending upon the concentration of the solution. The reaction mixture is then stirred for a short time at a slightly higher temperature, preferably at +30° to +40° C., after which the reaction is complete.

The reaction cycle described above is another advantage of the process according to the invention. As a rule, it is only necessary to operate at a temperature of down to −10° C., a range which can be commercially controlled without any need for expensive apparatus.

The resulting solutions of methallyl sulphonic acid in the amides used are colorless and stable, they do not decompose or discolor when left to stand, and they do not react with water. In order to recover and isolate the salts, the solution is mixed with a corresponding base, is optionally filtered, and concentrated by evaporation. Concentration of the solution by evaporation is preferably carried out at reduced pressure. Neutralization may be carried out with alkali metal hydroxides, carbonates or hydrogen carbonates, and with corresponding alkaline earth metal compounds, which may be added to the reaction mixture either as solids or in the form of aqueous solutions with cooling, it only being necessary to ensure that no secondary reactions occur, for example between dimethyl formamide and concentrated sodium hydroxide. In such cases, it is of advantage to use dilute solutions or weak alkalis such as soda.

Ammonia, either in the form of a gas or in the form of an aqueous solution, and organic bases may also be used for neutralization. In every instance, the mixture should show a pH value of from 6 to 8 following dilution of a sample with water, because free methallyl sulphonic acid decomposes when concentrated by evaporation and gives rise to brown discolorations. The reaction product is then worked up as described above.

The invention is further illustrated by the following examples, in which parts by weight relate to parts by volume as kilogram to liter.

EXAMPLE 1 a. Preparation of the DMF/SO$_3$-complex by the Conventional Process

Thirty-five parts by weight of pure liquid sulphur trioxide are added dropwise with thorough stirring at −10° C. to 200 parts by volume of anhydrous dimethyl formamide (DMF) in a dry stirrer-equipped apparatus, appropriate steps being taken to ensure that all the SO$_3$ crusts formed are wetted with liquid. Atmospheric moisture must be kept out.

b. Reaction with Isobutylene and Working Up

Twenty-six parts by weight of isobutylene are introduced while stirring at −10° to −15° C into the suspension of SO$_3$/DMF in excess DMF prepared as described in (a), and the cooling system is removed. After gentle heating from outside, excess isobutylene begins to evaporate above −5° C. and is condensed in a trap cooled with dry ice. The reaction mixture then undergoes a spontaneous increase in temperature to 30° C and is stirred for another hour with gentle heating at 30° to 35° C.

The colorless mixture is neutralized, while stirring and cooling, with a solution of approximately 25 parts by weight of sodium carbonate in 90 parts by volume of water until its pH-value is 7.5, and is filtered and concentrated by evaporation in vacuo. After the final drying, 60 parts by weight or 87 percent of the theoretical of pale yellowish sodium methallyl sulphonate with a melting point of 240° to 245° C and a sulphate content of 0.1 percent by weight are left as residue.

EXAMPLE 2 a. Preparation of the SO$_3$/DMF-complex by the Conventional Process

A reactive mixture is prepared as described in Example 1(a), from 1,000 parts by volume of dimethyl formamide by distilling in 177 parts by weight of SO$_3$ from 65 percent by weight of oleum. In order to test its stability, this mixture is left standing for 3 days at room temperature (20° to 30° C), resulting in the formation of a clear yellow solution.

b. Reaction with Isobutylene and Working Up

One hundred and forty parts by weight of isobutylene are introduced with thorough stirring at −10° C. into 700 parts by volume of anhydrous dimethyl formamide, after which the solution prepared in accordance with (a) is added dropwise at the same temperature. The solution is slowly heated and finally stirred for 30 minutes at 50° C. It is neutralized with potassium carbonate solution while cooling, filtered and concentrated by evaporation. Residue: 280 parts by weight or 80 percent of the theoretical, based on the SO$_3$ used, of pale yellowish sodium methallyl sulphonate with a sulphate content of 0.8 percent by weight. Accordingly, storage of the SO$_3$/DMF-complex did not in any way adversely affect the reaction.

EXAMPLE 3 a. Preparation of the SO$_3$-complex

Three hundred and ten parts by weight of fuming sulphuric acid containing 65 percent of SO$_3$ are added dropwise with cooling and stirring to 1,000 parts by volume of dimethyl formamide.

b. Reaction with Isobutylene and Working Up

One hundred and forty-five parts by weight of isobutylene are introduced with stirring at −10° to +5° C. into the solution prepared in accordance with (a), and the mixture is left to rise to room temperature. It is then stirred for 20 minutes at +50° C and subsequently neutralized while cooling with a solution of 190 parts by weight of sodium hydroxide in 800 parts by volume of water. The deposit precipitated is suction-filtered, washed with a little acetone and dried. It consists of 160 parts by weight of substantially pure sodium sulphate.

The filtrate is concentrated in vacuo while stirring until a highly viscous crystal suspension is obtained. After cooling, this suspension is suction-filtered and the crystal cake washed with a little acetone and dried. Yield: 320 parts by weight or 81 percent of the theoretical of sodium methallyl sulphonate in the form of pure white glossy flakes with a sulphate content of less than 0.1 percent by weight.

After the residual mother liquor has been completely concentrated by evaporation, 65 parts by weight or 16 percent of the theoretical of yellowish sodium methallyl sulphonate are again left as residue.

EXAMPLES 3 TO 7

These examples were carried out in substantially the manner described in Example 1. The reaction conditions, the amounts of reactant, and the products obtained are set out in the table below.

substances are removed by filtration. The clear filtrate is then concentrated by the vacuum distillation of 160 parts by weight of a dimethyl formamide-water mixture until a crystal paste which can still just be stirred is formed. The crystal mass is suspended in 60 parts by weight of methanol, suction-filtered and washed twice with 10 parts by weight of methanol on each occasion. After drying in vacuo at 80° C. 46.8 parts by weight of sodium methallyl sulphonate are obtained, corresponding to 79 percent of the theoretical based on the sulphur trioxide used.

After the methanol has been removed by distillation, the mother liquor is used in a second test identical both in regard to the substances used and to the procedure adopted, before distillation of the dimethyl formamide-water mixture. After working up, the yield of sodium methallyl sulphonate comprises 52.6 parts by weight or 88.7 percent of the theoretical.

Following repeated recycling of the mother liquor, the yields from the further tests are as follows:

Test No.3: 53.7 parts by weight = 90.6 percent of the theoretical

TABLE

| Example No. | Complex former* | Parts by vol. | SO₃, parts by weight | Isobutylene, parts by weight | Neutralised with— | Yield of salt parts by weight | percent |
|---|---|---|---|---|---|---|---|
| 3 | DMF | 1,000 | 120 | 120 | NH₃-gas | 196 | 85 |
| 4 | DMF | 2,000 | 242 | 200 | NH₃-aqueous conc. | 366 | 79 |
| 5 | DMF | 1,000 | 187 | 155 | K₂CO₃ solution | 330 | 81 |
| 6 | DMA | 800 | 80 | 70 | Na₂CO₃-solution | 137 | 87 |
| 7 | NMP | 800 | 150 | 175 | 10% sodium hydroxide | **212 | 72 |

*Abbreviations: DMA=N,N-dimethylacetamide; DMF=N,N-dimethylformamide; NMP=-methyl-2-pyrrolidone.

**In this case, the solution was filtered after neutralisation and concentrated in vacuo until all the water had been removed, the crystals suction-filtered after cooling and washed with acetone.

EXAMPLE 9

Thirty parts by weight of liquid sulphur trioxide with a temperature of +40° C. are added over a period of 2 hours with cooling at +20° to +30° C to 120 parts by weight of dimethyl formamide. Twenty-two parts by weight of liquid isobutylene are introduced into the suspension through an inlet tube immersed to a considerable depth in it with gentle cooling over a period of 3 hours at +20° C. and at a pressure of 0.5 to 1 atmosphere. After the isobutylene has been added, the temperature is increased to +35° C. over a period of an hour and the reaction mixture is stirred at this temperature until a clear solution is formed. The acid solution is neutralized while cooling at 30° C. with a mixture of 34.5 parts by weight of 45 percent by weight sodium hydroxide solution and 94 parts by weight of water. The foreign salts precipitated and insoluble foreign Test No.4: 58.0 parts by weight = 97.8 percent of the theoretical Test No.5: 53.85 parts by weight = 90.8 percent of the theoretical

What we claim is:

1. A process for the production of methallyl sulphonic acid, which comprises reacting isobutylene with a complex of sulphur trioxide and an amide compound selected from the group consisting of a N,N-dimethyl-, N,N-diethyl-formamide, N,N-dimethyl-, N,N-diethyl acetamide, N-methyl-2-, N-ethyl-2- pyrrolidone and N-methyl caprolactam said reacting being effected in a reaction medium consisting of an excess of said amide compound at a temperature of from −20° to +60° C., and employing at least 1 mol of isobutylene to 1 mol of sulphur trioxide.

* * * * *

UNITED STATES PATENT OFFICE
CERTIFICATE OF CORRECTION

Patent No. 3,694,493  Dated September 26, 1972

Inventor(s) Gunter Lorenz; Heinrich Rinkler and Gunther Nischk

It is certified that error appears in the above-identified patent and that said Letters Patent are hereby corrected as shown below:

| COLUMN | LINE | ERROR |
| --- | --- | --- |
| 4 | 9 | the word "system" should be deleted- |
| 4 | 54 | "Example 3" should read ---Example 8---. |
| 5 | In the table | "NMP= -methyl-2-" should read --NMP=N-methyl-2- ---. |

Signed and sealed this 14th day of January 1975.

(SEAL)
Attest:

McCOY M. GIBSON JR.
Attesting Officer

C. MARSHALL DANN
Commissioner of Patents